United States Patent [19]

Campbell

[11] 4,451,594

[45] May 29, 1984

[54] FILM FORMER EMULSIFICATION

[75] Inventor: Leslie E. Campbell, Newark, Ohio

[73] Assignee: Owens-Corning Fiberglas Corporation, Toledo, Ohio

[21] Appl. No.: 474,081

[22] Filed: Mar. 10, 1983

[51] Int. Cl.³ .............................................. C08K 5/06
[52] U.S. Cl. .................................. 523/336; 523/337; 524/109; 524/601; 524/604
[58] Field of Search ................ 523/336, 337; 524/109, 524/601, 604

[56] References Cited

U.S. PATENT DOCUMENTS

| | | | |
|---|---|---|---|
| 3,533,982 | 10/1970 | Schmidt et al. | 523/337 |
| 3,852,234 | 12/1974 | Venema | 523/336 |
| 4,022,736 | 5/1977 | Schmitt | 523/337 |
| 4,147,681 | 4/1979 | Lim et al. | 523/336 |

*Primary Examiner*—Ronald W. Griffin
*Attorney, Agent, or Firm*—Ronald C. Hudgens; Greg Dziegielewski; Philip R. Cloutier

[57] ABSTRACT

A method of emulsifying an unsaturated diallylphthalate-based resin to form a continuous water phase emulsion which involves mixing a diallylphthalate-based resin with a specified emulsifying agent, adding water and agitating to form an emulsion in which the aqueous phase is the continuous phase.

6 Claims, No Drawings

FILM FORMER EMULSIFICATION

This invention pertains to a method of film former emulsification.

In one of its more specific aspects, this invention pertains to a method of emulsifying unsaturated diallylphthalate based resins.

BACKGROUND OF THE INVENTION

In the production of sizes for glass fibers, a film former is usually incorporated in the formulation. Such formulations are usually aqueous-based but are comprised of a plurality of materials, not all of which are water soluble. Accordingly, it is frequently desirable to convert such non-soluble materials into emulsions for the purpose of providing some degree of compatability with the other components of the formulation.

Some of the materials frequently included in glass fiber sizes are unsaturated diallylphthalate-based resins. However, their use has been limited because of the difficulties in converting them into suitable emulsions. This invention is directed to the solution of that problem.

STATEMENT OF THE INVENTION

According to this invention there is provided a method of producing an aqueous emulsion comprising an unsaturated diallylphthalate-based resin which method comprises mixing the resin and an emulsifying agent to form a first composite, adding water to the first composite to form a second composite and agitating the second composite until an inversion takes place and an emulsion in which the water is the continuous phase is formed.

In one embodiment of the invention, the first and second composites are maintained at temperatures less than about 95° F.

In another embodiment of the invention, the emulsion in which the water is the continuous phase is diluted with water to form an emulsion having a viscosity within the range of from about 10,000 to about 20,000 cps at which viscosity the particle size is within the range of from about 0.1y to about 0.5y and the solids content is within the range of from about 50 to about 60 percent by weight.

DESCRIPTION OF THE INVENTION

The method of this invention is suitable for emulsifying any unsaturated diallylphthalate-based resin. It is particularly suitable for emulsifying a material such as MR70D produced by USS Chemical.

Any suitable surfactant or emulsifying agent can be employed. One particularly suitable emulsifying agent is Pluronic F108 made by B.A.S.F. Wyandotte. This material comprises a poly(oxypropylene) poly(oxyethylene). Preferably, the emulsifying agent will have an HLB (hydrophilic-hydrophobic balance) within the range of from about 22 to about 30. The emulsifying agent will be employed in an amount of about 10 to about 15 percent of the weight of the resin.

In the preferred method of the invention, deionized water is employed. Water addition is carried out under high shear at a rate of from about 2 to about 3 gals. per minute per 5,000 pounds of resin until the inversion takes place. Thereafter, water addition is decreased to a rate of about 1 gal. per minute until the desired viscosity is attained.

Agitation of the composites is conducted at high shear conditions during the entire process.

The method of carrying out the emulsification of an unsaturated diallylphthalate-based resin is demonstrated by the following.

4910 pounds of a diallylphthalate-based resin at 65° F. were introduced into a kettle. 146 pounds of an emulsifier were introduced into the kettle and agitation was begun employing a high shear circular blade and a sweep type blade at 300 rpm. Agitation was carried out for 45 minutes after which the speed was increased to 500 rpm.

Water addition was then begun at a rate of about 2 gals. per minute. When approximately 105 gals. of water has been added, the water addition rate was reduced to 1 gal. per minute until the desired viscosity was attained, after which stirring was continued for 15 minutes.

At all times during the process, the temperature was maintained at less than 95° F.

The emulsion was employed in an aqueous size for glass fibers as a film former which size, upon drying, was soft and styrene soluble. The size, due to the presence of the diallylphthalate-based resin, possessed excellent compatibility in polyester and vinyl ester laminating resins.

It will be evident from the foregoing that various modifications can be made to this invention. Such however, are considered within the scope of the invention.

I claim:

1. A method of producing an aqueous emulsion of an unsaturated diallylphthalate-based resin which comprises:
   a. mixing said resin with an emulsifying agent comprising a poly(oxypropylene) poly(oxyethylene) to form a first composite;
   b. adding water to said first composite to form a second composite;
   c. agitating said second composite to form an emulsion in which the aqueous phase is the continuous phase.

2. The method of claim 1 in which said first and said second composites are maintained at temperatures of less than about 95° F.

3. The method of claim 1 in which said emulsion is diluted with water to form an emulsion having a viscosity within the range of from about 10,000 to about 20,000 cps at a temperature less than 95° F.

4. The method of claim 1 in which said second composite is agitated to produce an emulsion having a particle size within the range of from about 0.1 to about 0.5u.

5. The method of claim 1 in which water is added in step b at a first rate of from about 2 to about 3 gallons per minute per 5,000 pounds of resin until an inversion takes place.

6. The method of claim 5 in which water is added at the rate of about 1 gallon per minute per 5,000 pounds of resin after said inversion.

* * * * *